United States Patent [19]

Yardley

[11] Patent Number: 5,109,940

[45] Date of Patent: May 5, 1992

[54] AUTOMATED GUIDED VEHICLE TOP DISPOSED TOWING APPARATUS

[75] Inventor: James V. Yardley, Centerville, Utah

[73] Assignee: Eaton-Kenway, Inc., Salt Lake City, Utah

[21] Appl. No.: 664,702

[22] Filed: Mar. 5, 1991

[51] Int. Cl.⁵ ............................................. B62D 1/24
[52] U.S. Cl. .................................... 180/168; 280/496; 280/511
[58] Field of Search .......... 180/168, 235, 6.5; 280/433, 492, 511, 496, 901

[56] References Cited

U.S. PATENT DOCUMENTS

| | | | |
|---|---|---|---|
| 3.770.297 | 11/1973 | Quick | 280/433 X |
| 3.773.136 | 11/1973 | Palazetti | 180/98 |
| 3.837.675 | 9/1974 | Barnes et al. | 280/433 X |
| 4.043.418 | 8/1977 | Blakeslee | 180/98 |
| 4.639.015 | 1/1987 | Pitts | 280/433 X |
| 4.657.274 | 4/1987 | Mann et al. | 280/433 |
| 4.731.867 | 3/1988 | Seabury | 455/41 |
| 4.800.978 | 1/1989 | Wasa et al. | 180/168 |
| 4.807.714 | 2/1989 | Blau et al. | 180/168 |
| 4.847.774 | 7/1989 | Tomikawa et al. | 364/449 |
| 4.921.266 | 5/1990 | Beals | 280/433 X |
| 4.987.540 | 1/1991 | Luke, Jr. | 364/424.02 |
| 4.993.507 | 2/1991 | Ohkura | 180/168 |
| 4.996.468 | 2/1991 | Field | 318/587 |
| 5.000.279 | 3/1991 | Konda et al. | 180/168 |
| 5.023.790 | 6/1991 | Luke, Jr. | 364/424.02 |

FOREIGN PATENT DOCUMENTS

| | | |
|---|---|---|
| 2920181 | 11/1980 | Fed. Rep. of Germany . |
| 56-118602 | 9/1981 | Japan . |
| 61-112215 | 5/1986 | Japan . |
| 50650538 | 3/1979 | U.S.S.R. . |

Primary Examiner—Andres Kashnikow
Assistant Examiner—Michael Mar
Attorney, Agent, or Firm—Lynn G. Foster

[57] ABSTRACT

A novel trailer towing apparatus for an AGV whereby downwardly applied, vertically oriented towing loads are substantially, directly imposed upon the drive wheels of the AGV, thereby increasing wheel to ground frictional forces and resulting towed load capacity. The towing apparatus is attached to the top of the AGV thereby allowing the AGV to turn through a 360° radius without moving the trailer.

2 Claims, 2 Drawing Sheets

AUTOMATED GUIDED VEHICLE TOP DISPOSED TOWING APPARATUS

FIELD OF INVENTION

This invention relates to automated guided vehicle (AGV) towing apparatus for automated guided vehicles and more specifically to top disposed towing apparatus for AGV's.

DESCRIPTION OF RELATED ART

Towing trailers with a rear mounted towing apparatus on AGV's is well known in the art. Commonly a commercial hitch and ball are mounted at one end of the AGV, usually the rear, whereat a trailer comprising a releasible socket and tow bar is connected.

Such towing connections generally comprise loads which are placed upon the AGV outside the perimeter of the AGV wheelbase. Such connections impose vertical loads which are counterbalanced by the weight of the vehicle across fulcra formed by the AGV wheels nearest the trailer and define turn radii for vehicle and trailer which are restricted by the geometry of the relative disposition of the AGV steering wheels and trailer connection to the AGV. When such counterbalanced loads are downwardly applied across fulcra formed by the non-powered wheels, the vertical force on the powered wheels is reduced, thereby reducing the frictional drive force between the wheel and the ground and subsequently reducing the pulling capacity of the AGV.

BRIEF SUMMARY AND OBJECTS OF THE INVENTION

In brief summary, this novel invention alleviates all of the known problems related to a rear mounted towing apparatus for each AGV comprising a relatively unfettered top with clearance for a tow bar. The invention comprises a towing ball mounted within the perimeter of the wheel base and substantially above the center of gravity of the AGV. The invention is particularly effective when mounted in the top center substantially directly above the center of gravity of an AGV which comprises bidirectionally powered drive wheels disposed on each side of the AGV along a center line which bisects the front of the AGV from the rear. With a tow bar, connected to and extending from the towing ball of the AGV, of sufficient length to allow the AGV to turn thereunder without contacting an attached trailer, the AGV makes a 360° turn radius without moving the trailer. Thus, the AGV is turnable to initially vector a moving force on the trailer in any direction.

As lifting or carrying components may reside on a lift top AGV, an angled tow bar is provided which provides 360° clearance over such components. The tow bar comprises a socket which makes a standard connection with the towing ball. Thus, the towing ball receives vertical forces which are transferred to the AGV from the trailer within the perimeter of the wheel base and substantially above the center of gravity. Thereby, downward vertical force received from the trailer through the tow bar increases normal force on the drive wheels and resulting frictional force disposed between the drive wheels and the ground. Thus, effective AGV towing capacity is increased by the increased frictional force between the AGV drive wheels and the ground. Further, each lift top comprising a towing ball is lifted to engage and lowered to disengage the socket in the tow bar, there by providing automatic engagement and disengagement between the towing ball and the socket.

Accordingly, it is a primary object to provide a towing ball disposed on the top of an AGV which comprises a substantially free or clear top whereabouts an attached tow bar rotates.

It is another primary object to provide a towing ball disposed substantially directly above the center of gravity of the AGV.

It is still another primary object to provide a towing ball disposed within the perimeter of the wheel base of the AGV.

It is another important object to provide a two bar which releasibly attaches to the towing ball whereby the AGV is able to turn 360° without imposing moving force to the trailer.

It is another important object to provide a tow bar which releasibly attaches to the towing ball and further comprises an angular bend to clear all objects disposed on top of the AGV whereby the AGV is able to turn 360° without imposing moving force to the trailer.

It is another object to provide a towing ball which is firmly affixed but releasibly attached to the AGV.

These and other objects and features of the present invention will be apparent from the detailed description taken with reference to accompanying drawings.

DETAILED DESCRIPTION OF THE ILLUSTRATED EMBODIMENTS

Figure 1:
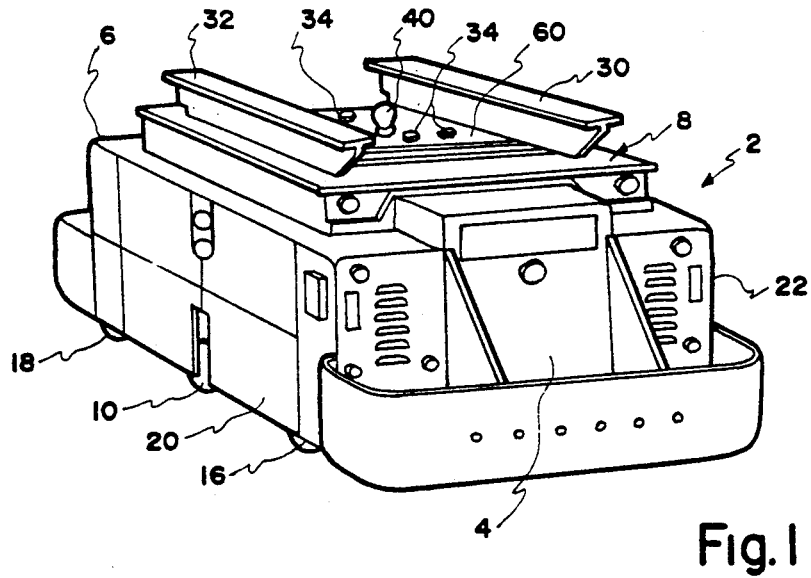
FIG. 1 is a perspective of an AGV comprising a substantially clear lift top to which a towing ball is attached.

In this description, the term proximal is used to indicate the segment of the device normally closest to a towing ball on an automated guided vehicle (AGV). The term distal refers to a distance away from the towing ball. Reference is now made to the embodiments illustrated in FIGS. 1–5 wherein like numerals are used to designate like parts througout. Referring to FIG. 1, wherein an AGV 2 is seen to comprise a substantially flat or clear top 8. Top 8 is seen to comprise rails 30 and 32 disposed for purposes of lifting a load placed thereupon. It is emphasized that the scope of the invention is not restricted to lift top AGV's and generally comprises attachment to automated guide vehicles which comprise tops over which a tow bar may rotate without contacting other parts disposed in the way of the rotating bar. Such rotation may be limited to less than 360°.

In the currently preferred embodiment, AGV 2 comprises a powered drive wheel 10 centrally disposed on each side 20 and 22 of AGV 2. (Only one drive wheel 10 is shown.) Each drive wheel is bidirectionally powered allowing AGV 2 to turn 360° without moving forward or backward. Four passive casters, two of which are seen as wheels 16 and 18, are disposed at each corner of the vehicle for stability and mobility. Each caster swivels to allow a turn of any angle.

To provide support for lifting, each rail 30 and 32 is welded, bolted, or otherwise affixed on each side of AGV 2 to a mounting plate 60 which is disposed at the level of top 8. Centrally disposed in mounting plate 60 is a towing ball 40. Such towing balls are known and available in the art. A towing ball comprising a two inch diameter may be used.

Figure 5:
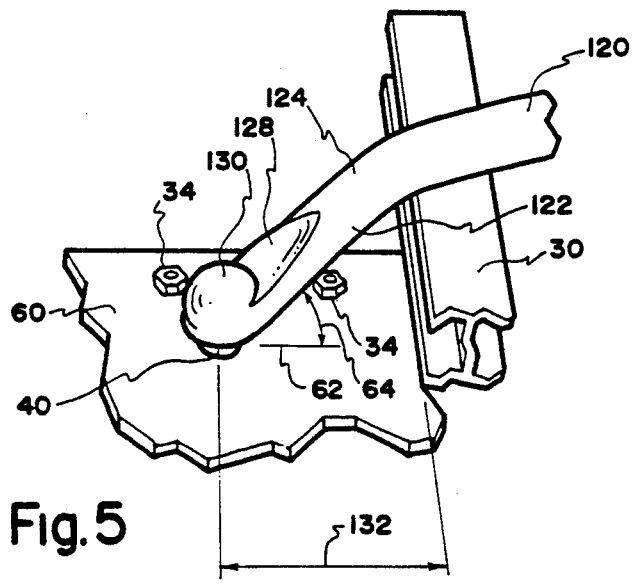
FIG. 5 is a perspective of a section of the connection between the towing ball and tow bar of FIG. 2 with parts removed for clarity of presentation.
Figure 2:
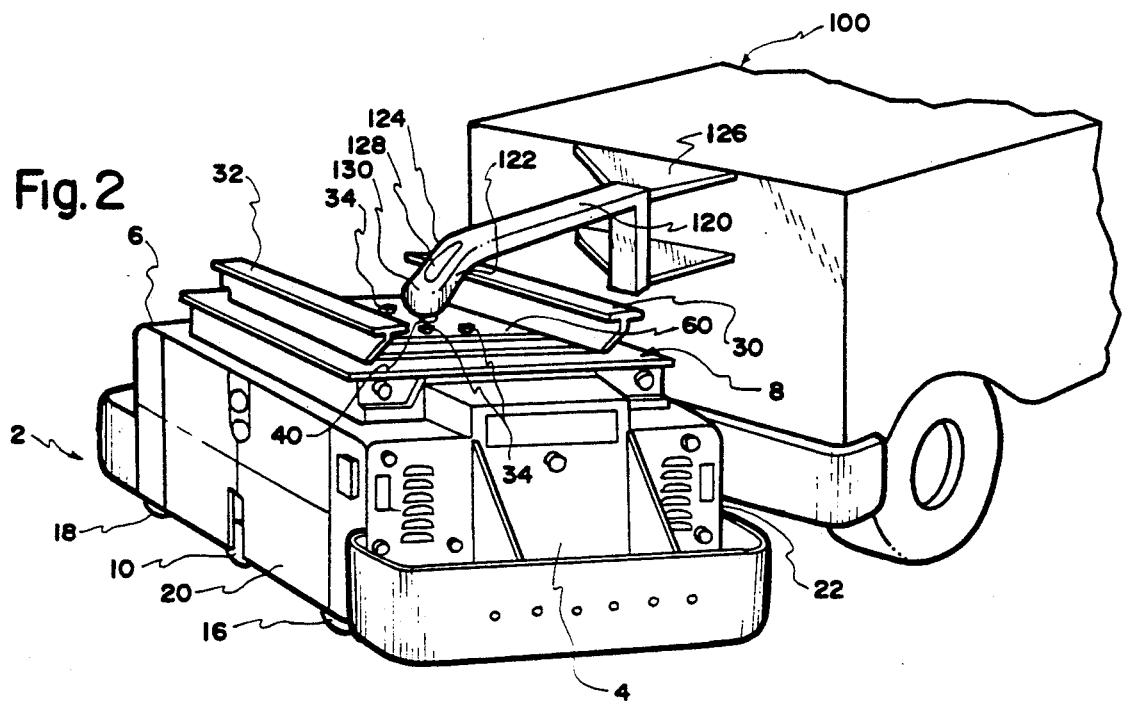
FIG. 2 is a perspective of the AGV seen in FIG. 1 attached by a tow bar to a trailer.

FIG. 2 comprises a trailer 100 releasibly attached to the AGV 2. Attachment is made through a tow bar 120 which is rigidly attached to trailer 100 in a manner which is well known by those skilled in the art of trailer construction. Tow bar 120 extends horizontally from trailer 100 for a distance which permits clearance of the longest distance from the position proximal to towing ball 40 distally to the furthest extremity of the AGV 2. Connection is made to towing ball 40 by a socket 130, disposed at the end of the tow bar 120. As seen in FIGS. 2 and 5, socket 130 releasibly connects to towing ball 40 in a manner which is known and commercially available in the art of trailer hitches. However, AGV 2 comprises a top 8 which is vertically moved to lift and lower loads; thereby, towing ball 40 is lifted to engage socket 130 and lowered to disengage socket 130 permitting engagement and disengagement through automatic lifting operation of AGV 2.

As best seen in FIG. 5, tow bar 120 comprises an angular rise from the end comprising socket 130 along rising member 122 to elbow 124. The vertical rise, comprising angle 64 from horizontal line 62, of member 122 is sufficient to provide clearance between each rail 30 and 32 at the shortest distance 132 between the proximal connection of socket 130 to towing ball 40 and the distal rail 30. Because towing ball 40 is essentially centrally disposed between rails 30 and 32 and rails 30 and 32 comprise essentially the same clearance height, clearance of rail 30 also implies clearance of rail 32. From elbow 124 to a rigid connection 126 on trailer 100, tow bar 120 is substantially horizontal, as best seen in FIG. 2. More generally, the bend at elbow 124 provides clearance over all components which reside on top 8 for all angles disposed by tow bar 120 from towing ball 40.

Figure 3:
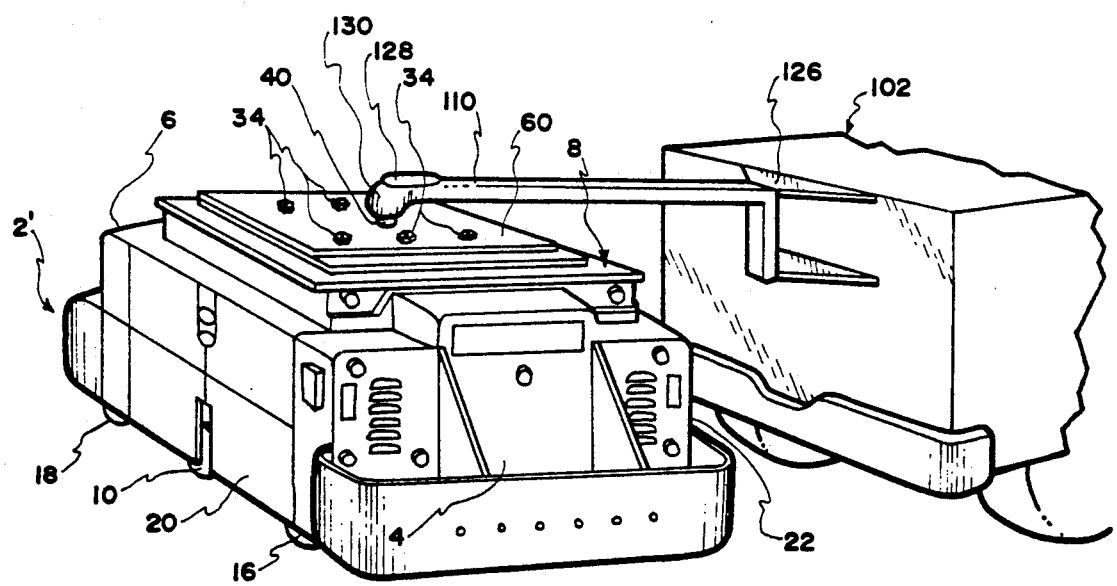
FIG. 3 is a perspective of an AGV comprising a free or clear top plate comprising an attached towing ball and an essentially straight tow bar connecting a trailer to the AGV.

Another currently preferred embodiment of the invention is seen in FIG. 3. In this embodiment, an AGV 2' comprises a unfettered top free of encumbrances such as rails 30 and 32 as seen on AGV 2 in FIG. 2. A trailer 102, similar to trailer 100, comprises tow bar 110 which releasibly connects to towing ball 40 through socket 130 disposed in the end of tow bar 110. However, tow bar 110 is essentially straight. In all socket/towing ball connections, standard safety features are provided such as safety latch 34, which is also generally available and known in the art.

Figure 4:
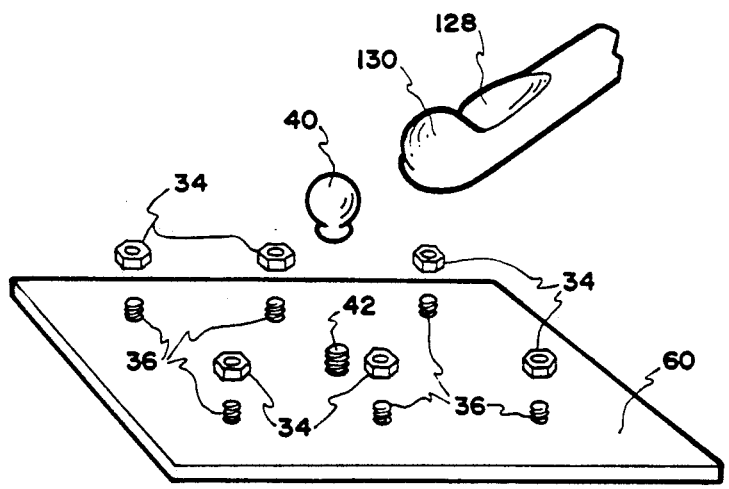
FIG. 4 is an exploded view showing connecting parts to the top plate seen in FIG. 3.

Towing ball 40 is releasibly, but firmly affixed to an AGV as seen in FIG. 4. In the currently preferred embodiments, mounting plate 60 is firmly affixed to AGV 2 or AGV 2' by a plurality of bolts 36 and nuts 34. Mounting plate 60 comprises a central hole 44 through which a mounting bolt 42 is inserted for attachment of towing ball 40. Towing ball 40 is threadably but firmly affixed by bolt 42 to mounting plate 60. So affixed, towing ball then releasibly connects to tow bar 120 or to tow bar 110 depending upon the attachment to AGV 2 or AGV 2', respectively.

Attachment of each tow bar 120 or 130 to AGV 2 or 2', respectively, is made by first releasing safety latch 128 and fully enclosing towing ball 40 into socket 130. Once socket 130 is so disposed, safety latch 128 is closed and locked in place. With trailer 100 or 102 so attached, AGV 2 or 2', respectively, is turned without providing motion to the attached trailer until a predetermined initial angle of movement is realized. At such time, AGV 2 or 2' is accelerated to move attached trailer 100 or 102. In cases of automatic connection by lifting top 8 of AGV 2 or AGV 2' to engage or lowering top 8 to disengage socket 130, safety latch 128 is not used. When safety latch 128 is unused in such cases, an electrical sensor (not shown) provides a safety indicator for feedback to the AGV 2 or AGV 2' electrical control systems. Such electrical sensors comprise such mechanical to electrical converters such as a micro switch which is known and available in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination, a trailer and an unmanned automated guided vehicle:

the vehicle comprising a main body having a front portion, a rear portion, opposed side portions, and a top surface, remotely controlled steering means, a pair of front floor engaging wheels disposed along respective sides of the vehicle, a pair of rear floor engaging wheels disposed along respective sides of the vehicle, individual means for bidirectionally driving each of said floor-engaging wheels, a mounting plate attached to said top surface, and hitch means attached to said plate in a centrally disposed location between said side portions and said front and rear pairs of wheels;

the trailer comprising two bar means which comprise means for releasibly coupling to said centrally disposed hitch means;

the centrally disposed hitch means being rotatably connected to said releasible coupling means for movement about a vertical axis extending through said hitch means;

whereby, responsive to the remotely controlled steering means, rotational movement of 360 degrees of the vehicle about said vertical axis without displacement of said trailer is possible as a result of selective directional driving of each of said wheels.

2. A trailer and an unmanned automated guided vehicle according to claim 1 including means for vertically displacing said hitch means relative to said main body of the vehicle.

* * * * *